US010393896B2

(12) United States Patent
Song

(10) Patent No.: US 10,393,896 B2
(45) Date of Patent: Aug. 27, 2019

(54) REAL-TIME IN-SITU SUB-SURFACE IMAGING

(71) Applicant: GEORGIA STATE UNIVERSITY RESEARCH FOUNDATION, INC., Atlanta, GA (US)

(72) Inventor: WenZhan Song, Johns Creek, GA (US)

(73) Assignee: GEORGIA STATE UNIVERSITY RESEARCH FOUNDATION, INC., Atlanta, GA (US)

( * ) Notice: Subject to any disclaimer, the term of this patent is extended or adjusted under 35 U.S.C. 154(b) by 86 days.

(21) Appl. No.: 15/321,962

(22) PCT Filed: Jun. 23, 2015

(86) PCT No.: PCT/US2015/037056
§ 371 (c)(1),
(2) Date: Dec. 23, 2016

(87) PCT Pub. No.: WO2015/200240
PCT Pub. Date: Dec. 30, 2015

(65) Prior Publication Data

US 2017/0139064 A1    May 18, 2017

Related U.S. Application Data

(60) Provisional application No. 62/016,319, filed on Jun. 24, 2014, provisional application No. 62/059,427, filed on Oct. 3, 2014.

(51) Int. Cl.
*G01V 1/00*   (2006.01)
*G01V 1/18*   (2006.01)
*G01V 1/22*   (2006.01)

(52) U.S. Cl.
CPC .............. *G01V 1/003* (2013.01); *G01V 1/181* (2013.01); *G01V 1/22* (2013.01); *G01V 2210/66* (2013.01); *G01V 2210/72* (2013.01)

(58) Field of Classification Search
CPC .......... G01V 1/003; G01V 1/22; G01V 1/181; G01V 2210/72; G01V 2210/66
USPC ........................................................... 367/72
See application file for complete search history.

(56) References Cited

U.S. PATENT DOCUMENTS

| 6,414,955 | B1 | 7/2002 | Clare et al. |
| 6,832,251 | B1 | 12/2004 | Gelvin et al. |
| 7,127,353 | B2 * | 10/2006 | Geiser ................. G01V 1/306 702/13 |

OTHER PUBLICATIONS

Shi et al., Imaging Seismic Tomography in Sensor Network, 2013 IEEE International Conference on Distributed Computing in Sensor Systems, pp. 304-306. (Year: 2013).*
Shi et al., "Imaging Seismic Tomography in Sensor Network", 2013 IEEE International Conference on Distributed Computing in Sensor Systems, May 20-23, 2013, 10 pages.
Song et al., "Air-dropped Sensor Network for Real-Time High-Fidelity Volcano Monitoring", MobiSys '09 Proceedings of the 7th international conference on Mobile systems, applications, and services, 2009, pp. 305-318.

(Continued)

*Primary Examiner* — Daniel L Murphy
(74) *Attorney, Agent, or Firm* — Meunier Carlin & Curfman LLC

(57) ABSTRACT

Systems and methods of real-time in-situ sub-surface imaging are described herein.

18 Claims, 8 Drawing Sheets

(56) References Cited

OTHER PUBLICATIONS

International Search Report and Written Opinion issued in International Application No. PCT/US15/37056, dated Sep. 30, 2015.
International Report on Patentability issued in International Application No. PCT/US15/37056, dated Jan. 5, 2017.
Extended European Search Report issued in European Application No. 15810909.0 dated May 2, 2017.
Tang et al., "An Energy Efficient Adaptive Distributed Source Coding Scheme in Wireless Sensor Networks", New Frontiers in Telecommunications: 2003 IEEE International Conference on Communications ; ICC 2003 ; May 11-15, 2003, Anchorage, Alaska, USA; UEEE International Conference on Communications, IEEE Operations Center, Piscataway, NJ, vol. 1, May 11, 2003, pp. 732-773.
Fernandez et al., "Low-Power Self-Energy Meter for Wireless Sensor Network", 2013 IEEE International Conference on Distributed Computing in Sensor Systems, May 20, 2013, pp. 315-317.
Raghavendra et al., "Distributed Signal Processing in Wireless Sensor Networks", Final Technical Report, Aug. 31, 2005, Retrieved from the Internet:URL: http : / /www.dti c.mi 'llget-tr-doc/pdf?AD= ADA437B24 [retrieved on Apr. 21, 2017], 58 pages.
Office Action issued for Chinese Application No. 201580040663.9, dated May 4, 2018.
Office Action issued for Chinese Applciation No. 201580040663.9, dated Jan. 24, 2019.

* cited by examiner

REAL-TIME IN-SITU SUB-SURFACE IMAGING

CROSS-REFERENCE TO RELATED APPLICATIONS

This application is a national stage application under 35 U.S.C. 371 based on application PCT/US2015/037056 filed Jun. 23, 2015, which claims priority to and benefit of U.S. Provisional Patent Application 62/016,319 filed Jun. 24, 2014 and U.S. Provisional Patent Application 62/059,427 filed Oct. 3, 2014, each of which are fully incorporated by reference and made a part hereof.

GOVERNMENT SUPPORT CLAUSE

This invention was made with government support under contract number 1125165 awarded by the National Science Foundation (NSF). The government has certain rights in the invention.

BACKGROUND

Static two-dimensional (2D) or three-dimensional (3D) sub-surface imaging, applied to oil field exploration and monitoring, are numerous and have been explored since the late 1970's. In petroleum exploration applications of time-lapse subsurface imaging, thousands of stations have been incorporated and are large-scale. However, they are still based on centralized off-line processing and are typically accomplished by multiple active-source recordings where variations over multiple year spans are the main goal. In both industry and academia, the seismic exploration does not yet have the capability of illuminating the physical dynamics with high resolution and in real-time, as it involves collecting the raw seismic data from sensors to data loggers then manually retrieving data for post processing which may take months to complete.

Recent sensor network technology has matured to the point where it is now possible to deploy and maintain large networks for real-time geophysical monitoring. Also the computing and communication capability of each sensor can be utilized for distributed tomographic inversion. Seismic imaging algorithms commonly in use today cannot be directly implemented under field circumstances because they rely on centralized algorithms and require massive amounts of raw seismic data collected from sensors and transmitted to a central processing unit. However; real-time transmission of the raw seismic data is not feasible due to the severe bandwidth and energy limitations of low-power sensor networks. Time varying, real-time seismic tomography thus requires a new approach, both with respect to tomographic algorithms and sensor network design. The research challenge here is to develop a new method for processing raw seismic data and computing tomography in-situ in real-time, under the severe, restricting constraints of limited network resources (bandwidth, energy, computing power, memory, etc.).

Therefore, what is needed is systems and methods that overcome challenges in the art, some of which are described above.

SUMMARY

Described herein are embodiments of a real-time sub-surface imaging system framework within sensor networks. Compared with the centralized method of data collection, the system, method and algorithms described herein perform real-time data processing and sub-surface imaging in the network while meeting the severe resource (bandwidth, energy, computing power, memory, etc.) constraints. Embodiments of the invention described herein have application to the fields far beyond the specifics of volcanoes, e.g., oil field explorations, mining and natural gas exploration have similar challenges and needs.

A distributed multi-resolution evolving tomography system is described to distribute the tomographic inversion computation load to the network. The sensor nodes deployed use the arrival times of seismic events and event locations to derive a multi-dimensional (e.g., 3D, 4D) velocity model of the geological structure. As more geophysical data (e.g., active or passive events) are recorded, the velocity model evolves over time to refine the existing one. This approach, apart from decentralization, is in sharp contrast to the traditional data collection then centralized post processing approaches. In this aspect, the arrival time of event at each node has been extracted from the raw seismic data by each node itself, and the sub-surface geophysical imaging related processing and computations can be performed in the sensor network. Embodiments of the algorithm described herein have application to the fields far beyond the specifics of volcanoes, e.g., geophysical explorations (such as oil, gas, mine explorations and production, and the like) have similar challenges and needs.

In one aspect, a real-time sub-surface imaging system is described. An embodiment of the system can be comprised of a mesh network of a plurality of sensor nodes. The sensor nodes can be wireless, wired or a combination of wireless and wired. In one embodiment, each sensor node can be comprised of a processor in communication with a memory; a communication module; an energy source; a sensor; and a sensor interface board. One or more of the sensor nodes can be configured to computationally perform at least a portion of real-time sub-surface imaging of an item of interest based at least in part on data received by the sensor node, and provide at least a portion of a real-time image of the item of interest to another sensor node or to a user.

Alternatively or optionally, one or more of the sensor nodes comprises a cluster head and the cluster head is in communication with at least one of the sensor nodes or a gateway. In one embodiment, the cluster head provides at least a portion of a real-time image of the item of interest to the gateway.

In other aspects, methods of real-time sub-surface imaging are described. One embodiment of the method comprises receiving, by at least one sensor node in a mesh network of a plurality of sensor nodes, geophysical data; computationally performing at least a portion of real-time sub-surface geophysical imaging of an item of interest based at least in part on data received by at least one sensor node; and transmitting at least a portion of a real-time image of the item of interest to another of the plurality of sensor nodes or to a gateway in communication with at least one of the plurality of sensor nodes. The sensor nodes can be wireless, wired or a combination of wireless and wired.

Alternatively or optionally, at least a portion of a real-time image of the item of interest is transmitted to a cluster head, wherein one or more cluster heads provide at least a portion of a real-time image of the item of interest to the gateway.

In the following description, travel-time tomography in a volcano is described as only one example of sub-surface imaging; however, embodiments of the invention are not limited to volcano applications, but are applicable to geophysical explorations and production (such as oil, gas and mine explorations and production) in general. Also, traveltime tomography algorithm is just one type of tomography algorithm, tomographic inversion is just one type of seismic imaging method, and seismic imaging is just one type of a sub-surface geophysical imaging method. Embodiments of the invention of system architecture and methods apply to many sub-surface imaging applications in general for real-time in-situ imaging.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1C:
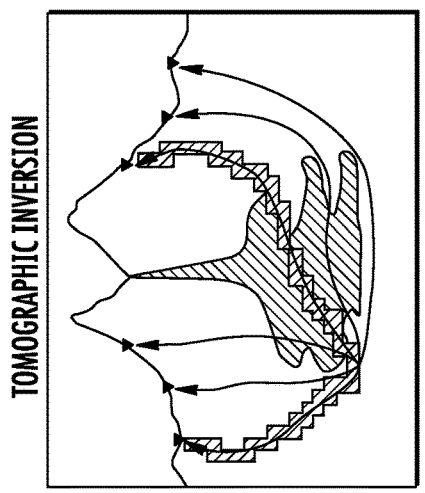
FIGS. 1a-1c illustrate exemplary procedures in traveltime seismic tomography.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Static tomography inversion for multi-dimensional (e.g., 3D) structures, applied to volcanoes and oil field explorations, has been explored since the late 1970's. In volcano applications, tomography inversion used passive seismic data from networks consisting of tens of nodes, at most. The development and application to volcanoes include Mount St. Helens, Mt. Rainier, Kliuchevskoi, Kamchatka, Russia, and Unzen Volcano, Japan. At the Coso geothermal field, California, researchers have made significant contributions to seismic imaging by coordinating tomography inversions of velocity, anisotropy, attenuation and porosity.

However, the resolution for such inversions is typically in kilometers or even tens of kilometers. Details pertaining to the complex plumbing systems of volcanoes cannot be resolved due to the lack of nodes coverage on the edifice where signals from the conduit system emanate. In petroleum exploration applications of time-lapse subsurface imaging, thousands of nodes have been incorporated. But the 3D imaging is still based on centralized off-line processing that may be months after and is typically accomplished by multiple active-source recordings where variations over multiple year spans are the main goal. The time scales involved in real-time hazard mitigation or microseismic monitoring of reservoirs and mining, on the other hand, are minutes to hours. To achieve effective disaster warnings and timely responses, new schemes and methodologies are required to solve the real-time seismic tomography problem. This is one motivation for developing distributed real-time in-situ sub-surface imaging systems and methods.

Described herein are systems and methods for real-time or near real-time sub-surface imaging. In one embodiment, systems and methods for real-time or near real-time seismic imaging based on travel-time tomography principles are disclosed. An exemplary system is described for real-time monitoring, data acquisition and distributed computation. Exemplary algorithms for efficient processing that are specifically developed to accommodate the system designs are also described, though it is to be appreciated that embodiments of the invention are not limited to the algorithms disclosed herein.

In one embodiment, the approach employed for seismic tomography as described herein is travel-time seismic tomography, which uses P-wave arrival times at sensor nodes to derive the internal velocity structure under the ground. This model is continuously refined and evolving, as more earthquakes or other active or passive events are recorded over time.

As noted above, one non-limiting embodiment of the invention comprises real-time seismic imaging based on travel-time tomography principles. The basic procedure of travel-time seismic tomography generally involves the following steps:

(1) Event Detection and Timing. Once a seismic disturbance happens, the nodes that detected the seismic disturbance can determine P-wave arrival times, which are then used to estimate the source location and origin time of the seismic disturbance. In various embodiments, seismic disturbances may be naturally occurring (volcanoes, earthquakes, etc.), or they may be induced (explosions concussion, etc.). Various methods and algorithms can be used for p-wave arrival time detection and picking according to embodiments of the invention.

(2) Event Source Localization. The P-wave arrival times from all nodes are then used to estimate the event source location and origin time.

(3) Tomographic Inversion. Following each event, seismic rays propagate to nodes and pass through anomalous media. These rays are perturbed and thus register anomalous residuals. Given the source locations of the seismic events and current velocity model of the volcano, ray tracing finds the ray paths from the seismic source locations to the nodes. The traced ray paths, in turn, are used to image a multi-dimensional (e.g., 3D or 4D (X, Y, Z and time)) velocity model of the geological structure within the volcano. A volcano or other item of interest (e.g., a field of oil, gas, mineral deposit, etc.) is partitioned into small blocks and the seismic tomography problem can be formulated as a large, sparse matrix inversion problem. These steps are illustrated in FIG. 1.

Examples of algorithms that can be used to solve the tomographic inversion problem, while meeting system design requirements, are described in "COMPONENT-AVERAGE BASED DISTRIBUTED SEISMIC TOMOGRAPHY IN SENSOR NETWORKS" by Kamath et al., pgs. 1-8, as published in the proceedings of the 2013 IEEE International Conference on Distributed Computing in Sensor Systems, May 20-23, 2013, Cambridge, Mass., which is incorporated by reference in its entirety, and made a part hereof; and "IMAGING SEISMIC TOMOGRAPHY IN SENSOR NETWORK" by Shi et al, pgs. 1-9, which was published in the proceedings of the 2013 10th Annual IEEE Communications Society Conference on Sensor, Mesh and Ad Hoc Communications and Networks (SECON), Jun. 24-27, 2013, New Orleans, La., which is incorporated by reference in its entirety, and made a part hereof, though it is to be appreciated that these algorithms are only examples and tomography is just one type of seismic imaging methods. Seismic imaging is just one type of sub-surface imaging method.

As noted earlier, travel-time tomography is provided only as an example of geophysical imaging that is possible with embodiments of the present invention. The invention is not limited to travel-time tomography, but in general apply to sub-surface geophysical imaging applications for real-time.

Figure 1B:
Figure 1A:
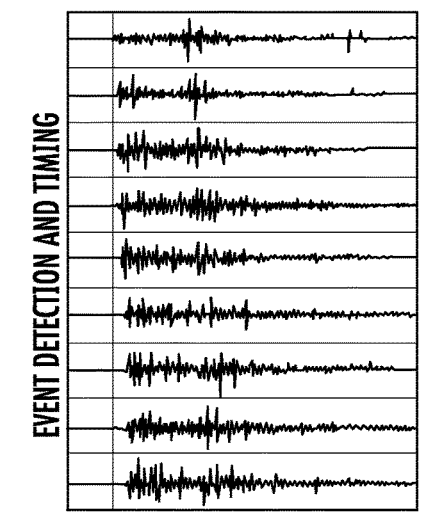

An embodiment of a system perspective for implementing the basic procedure of real-time sub-surface imaging is illustrated in FIGS. 1a-1c. As shown in this Figure, sensor nodes detect seismic disturbances (FIG. 1a) and determine arrival times, which are then used to estimate earthquake source locations (FIG. 1b) in the volcanic edifice. This, in turn, is used iteratively to image a multi-dimensional tomographic model (FIG. 1c) of the velocity structure within the volcano. Significant deviations from typical residuals indicate critical changes in the volcano's interior, such as magma injection or fluid flow. Generating and updating such a model is computationally intensive, however, and requires a high degree of accuracy in selection of events to process and derivation of signal arrival times at each station. The process is guided by node coordination and data fusion to reduce (eliminate) effects of noisy measurements or poorly-calibrated sensors. The flexibility available in sensor networks may involve a feedback loop from gateway (e.g., control center) to outlying sensor nodes that can adapt sampling and computation in the network as current state information is obtained.

The use of the technology described herein for seismic tomography can include microseismic imaging for industrial applications where induced seismicity monitoring is a subset or a step of it and full wave inversion seismic tomography. Microseismic imaging can be used to identify hydrofracturing event locations and induced seismicity monitoring can be used to identify the waste water injection event location and magnitude. The method can be considered as one step in seismic tomography. Approaches to microseismic imaging can include vertical tomography partitioning (as described in Shi et al.), component-average based distributed seismic tomography (as described in Kamath et al.), and decentralized optimization, time reversal and post-stack, among others.

Other uses of the described technology can include seismic migration, also known as active seismic imaging, which moves dipping reflectors to their true subsurface positions and collapses diffractions. Here, each node performs common-receiver migration computing to calculate a migration image. Then, those images are stacked to form a final image through distributed aggregation or decentralized average consensus. Yet another use of the described technology includes ambient noise seismic imaging, which does not require an earthquake or other active sources for imaging. With real-time in-situ ambient noise imaging, cross-correlations are conducted among the network nodes to get arrival time difference. Each node calculates an Eikonal tomography, then those images are stacked to form final image through distributed aggregation or decentralized average consensus. It is to be appreciated that embodiments of the system described herein can be extended as a general field instrumentation platform, and incorporate new geophysical data processing and imaging algorithms, beyond seismic.

Embodiments of the described technology can be applied to a wide range of geophysical exploration topics such as hydrothermal, oil exploration, mining safety, mining resource monitoring, and the like. Non-limiting examples of applications can include fossil fuels exploration and production (e.g., induced seismicity monitoring, exploration imaging, microseismic imaging), government and academic applications (e.g., seismic/volcanic studies, geological surveys, environmental applications) and other applications such as groundwater location and mapping, geothermal applications, landfill siting, bridge location studies, and the like.

System

Figure 2:
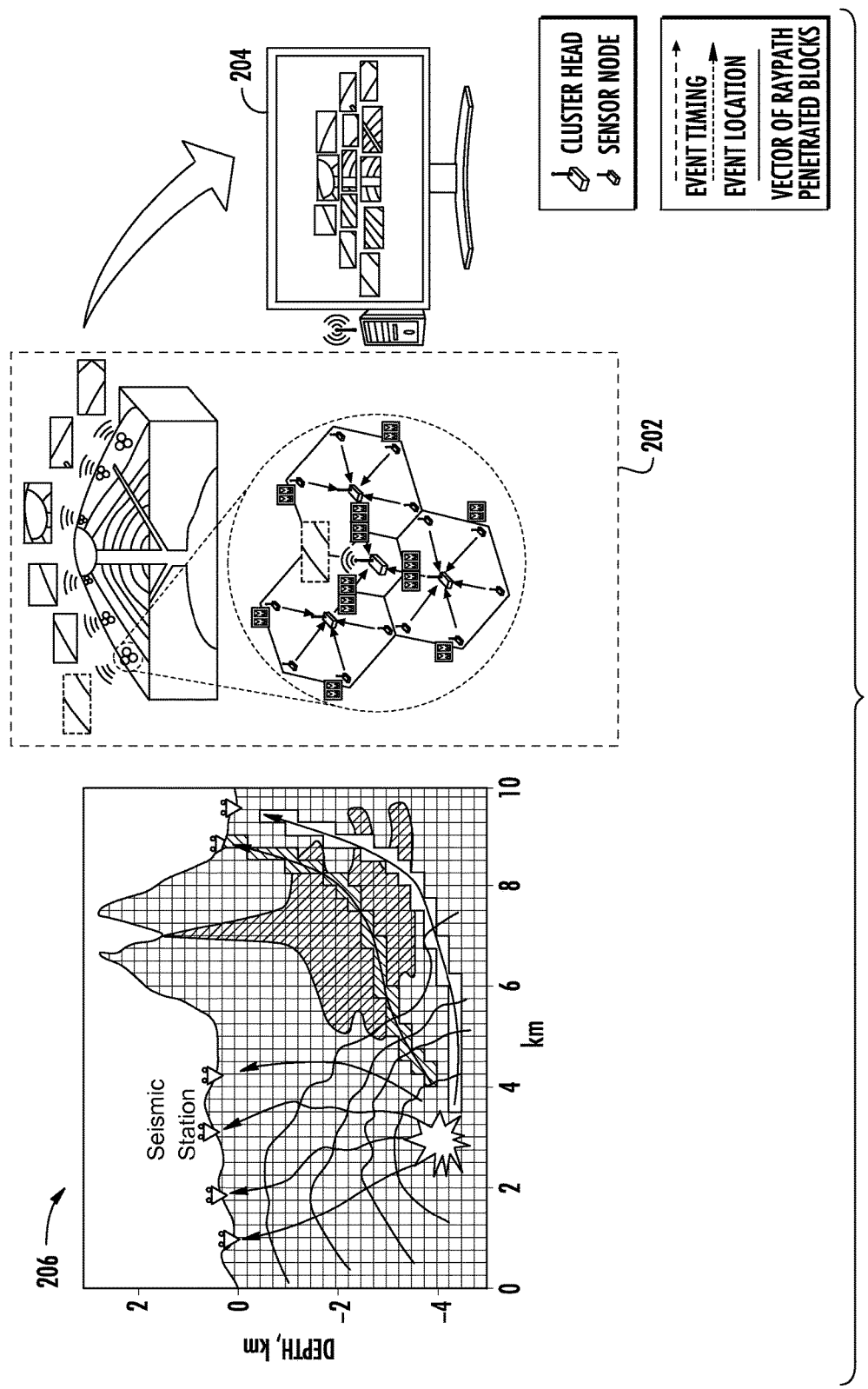
FIG. 2 is an embodiment of a system perspective for implementing the basic procedure of real-time sub-surface imaging.

Described herein are embodiments of a distributed in-network computation, adaptive in-network signal processing, and situation-aware network design to support real-time in-situ sub-surface imaging. FIG. 2 is an overview of an embodiment of a large-scale sensor network 202 of low-cost geophysical stations that sense and analyze seismic signals, and compute real-time, three-dimensional geophysical images of the study object in-situ and in real-time. Results can be delivered to a gateway 204 (which can then be accessed by remote computers via any wired or wireless networks, including the Internet or satellite) for visualization of the study object in real-time. The described system requires a transformative approach to tomography computation algorithm, collaborative signal processing, and the associated sensor network design. For example, the system of FIG. 2 can be used to sense and analyze seismic signals associated with volcanic activity 206.

Figure 3:
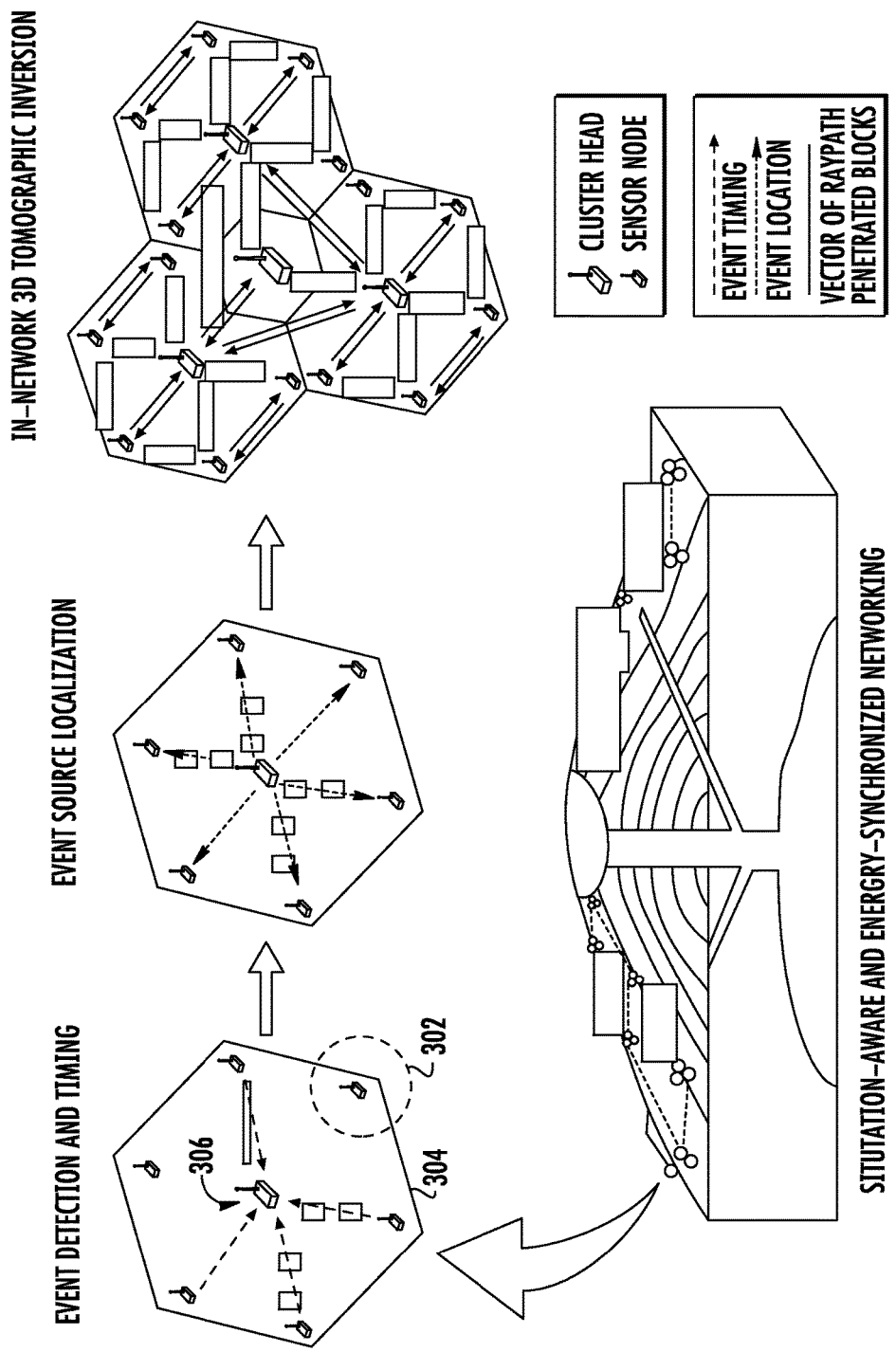
FIG. 3 is an illustration of a mesh network comprised of many sensor nodes that can be used for real-time sub-surface imaging.

As shown in FIG. 3, described herein is a mesh network comprised of many sensor nodes and a gateway (not shown FIG. 3) that can be used to perform real-time sub-surface imaging. Sensor nodes 302 dynamically self-organize and form an adaptive mesh network 304 (where some nodes may act as cluster heads 306) that allows them to communicate with each other and relay data to the gateway. All sensor 302 and cluster head 306 nodes are powered using, for example, solar panels and rechargeable batteries or other self-contained energy sources, and the gateway can be, for example, a microcomputer used for both control and monitoring of the sensor array as well as data storage and visualization. Sensor nodes 302 can be programmed to perform a wide range of tasks including sampling, storage, processing, and communication of sensor data. Typically, a sensor node 302 will continuously sample the sensor data buffering it to memory or flash. Nodes 302 can locally process sensor data, for example, performing event detection or waveform arrival time calculations. Nodes 302 may then communicate with cluster heads or amongst themselves to perform the distributed computations such as, for example, distributed tomography.

Figure 4:
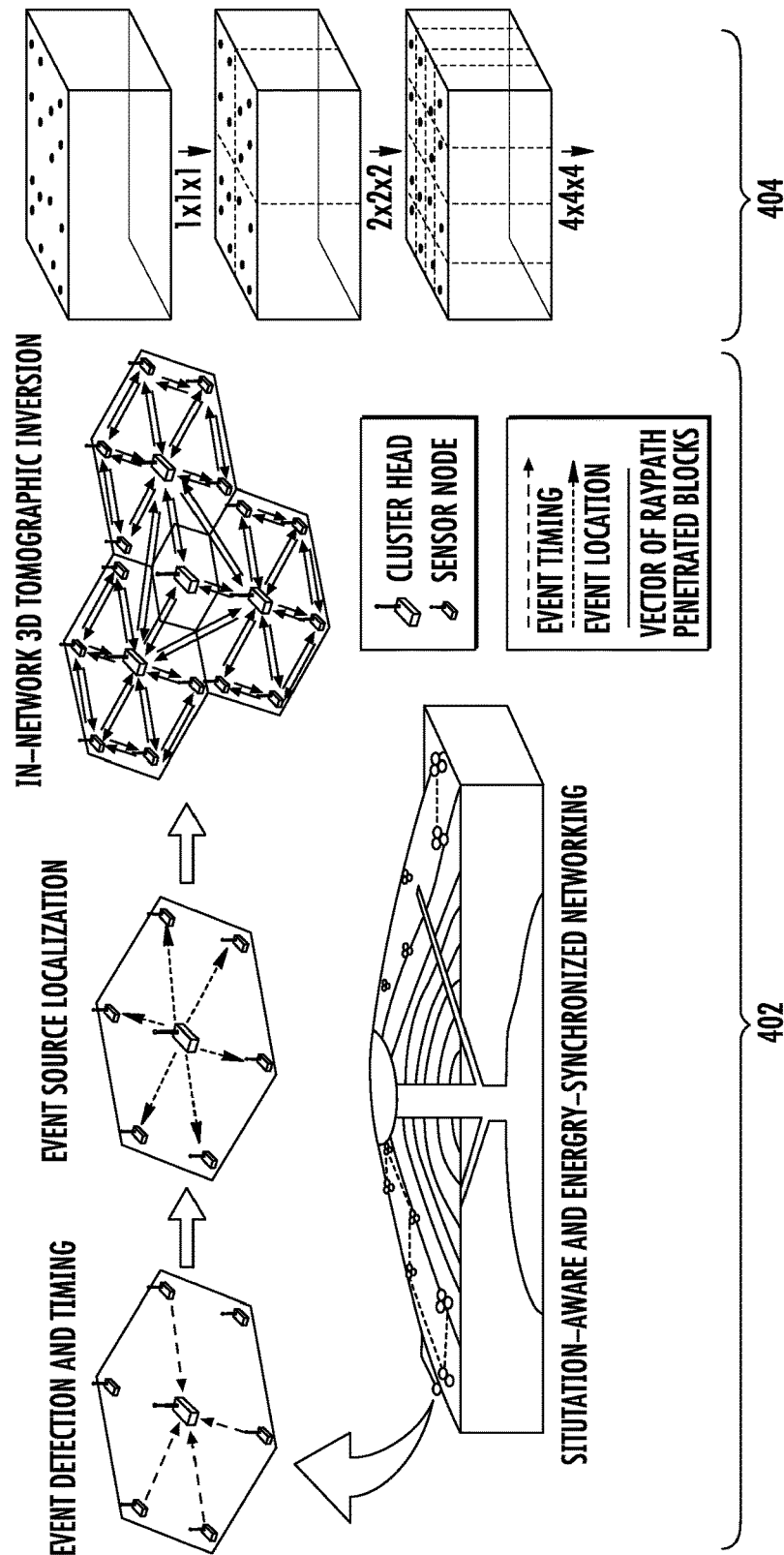
FIG. 4 is an illustration of exemplary system architecture and framework of real-time in-situ traveltime seismic tomography

FIG. 4 illustrates an exemplary system architecture and framework of real-time in-situ traveltime seismic tomography. As shown in FIG. 4, (402), the communication and computation architecture can be flat (where every node plays an equal role), or hierarchical (where some nodes are elected for heavier roles like a cluster head). On the right in FIG. 4 (404), the tomography computing is resolution-evolving, e.g., resolution increases as more events arrive. In this algorithm, because the computation on each landlord only uses part of the system As=t, the result is not equivalent to the solution of the original system. To approximate the optimal solution, the resolution-evolving scheme is introduced: the network initially computes a coarse resolution tomography without partition with small amount of seismic events; as more and more seismic events arrive, the network will compute finer and finer resolution tomography with more partitions.

The intuition behind this scheme is that the network first computes an outline of the tomographic structure in a low resolution and then fills up with the finer details inside. With the multi-resolution evolving scheme, there is no need to wait for all computation to be done and intermediate results can be retrieved in a real-time manner.

Figure 5:
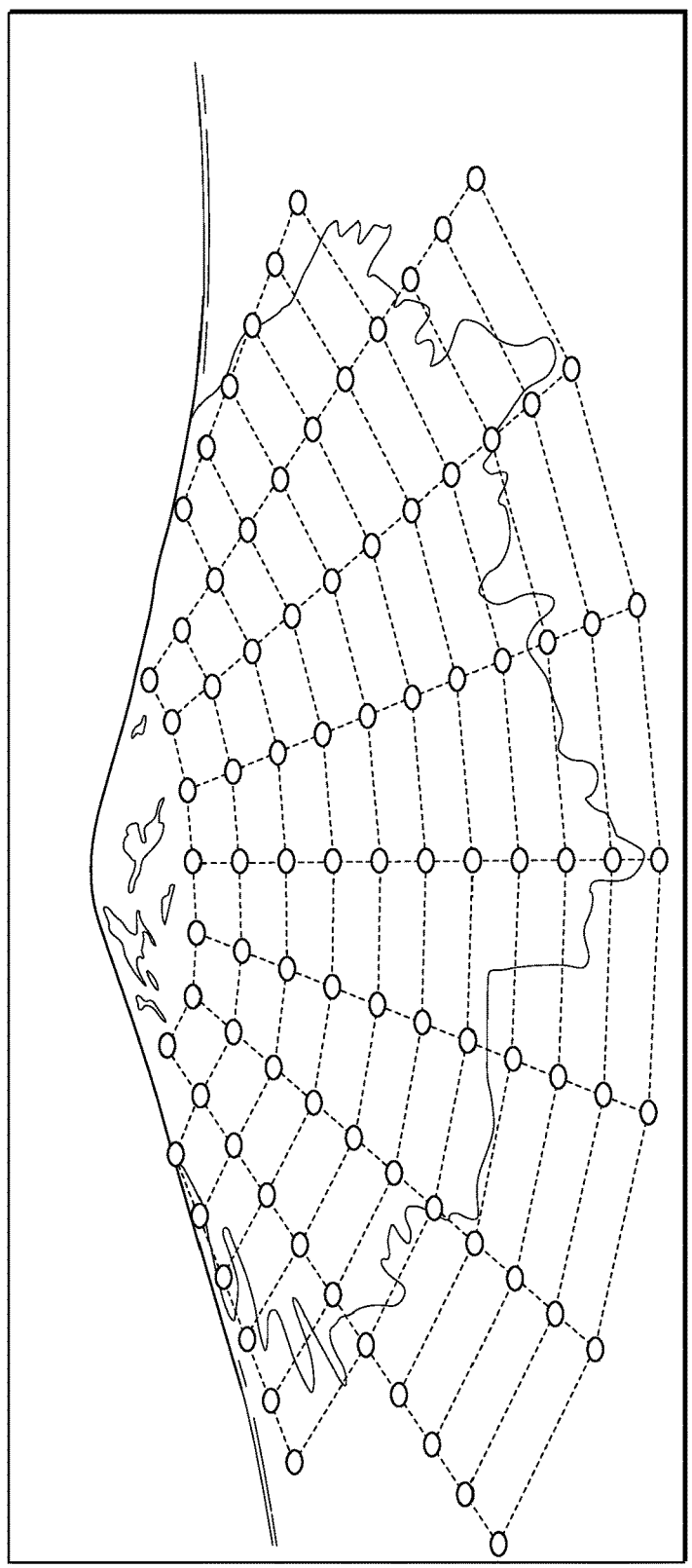
FIG. 5 illustrates an exemplary sensor network for in-situ sub-surface imaging, wherein each circle represents a sensor node.

FIG. 5 illustrates an exemplary sensor network for in-situ sub-surface imaging, wherein each circle represents a sensor node.

Figure 6:
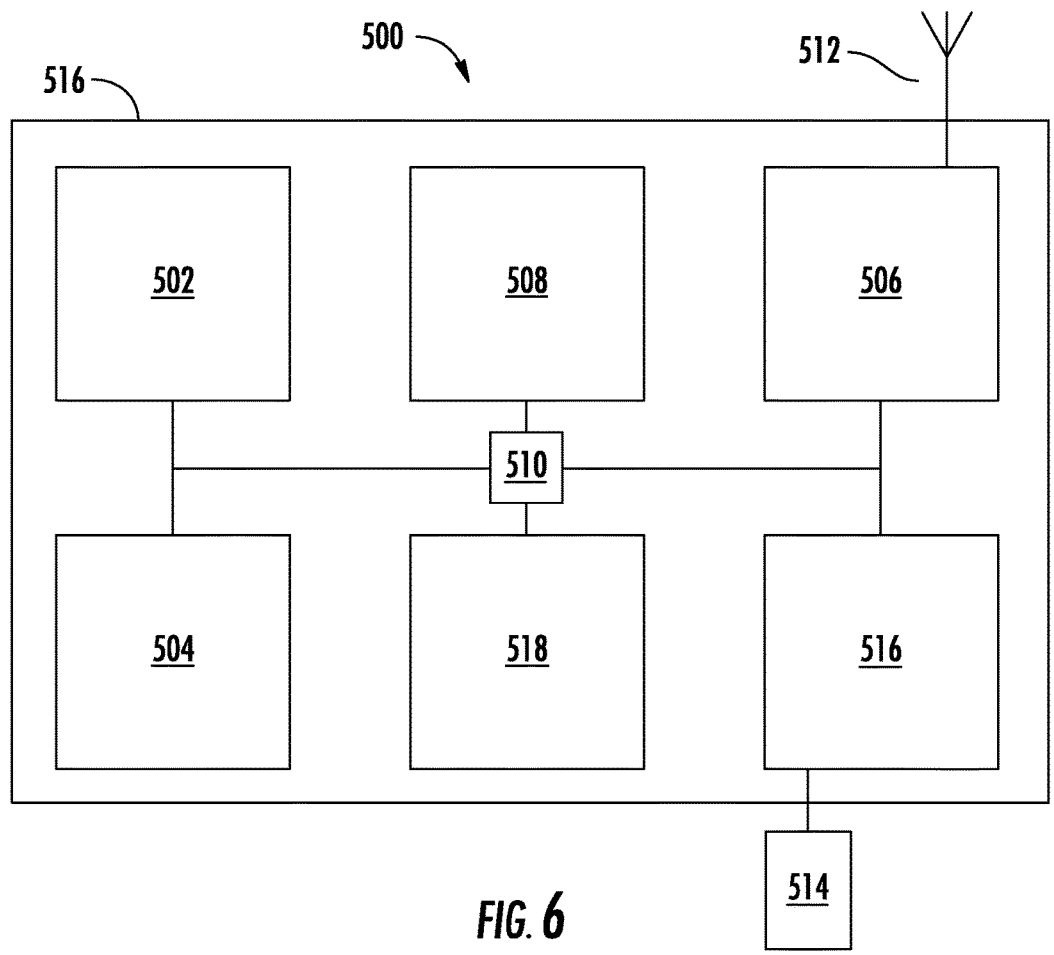
FIG. 6 is an illustration of an exemplary sensor node.

FIG. 6 is an illustration of an exemplary sensor node 500 comprised of a processor 502 in communication with a memory 504 and a communication module 506, and an energy source 508 and one or more sensors. In one embodiment, the sensor node 500 further comprises an energy meter 510. Some of the sensor nodes may be elected as a cluster head for embodiments of the present invention.

As may be understood from FIG. 6, in this implementation, the sensor node 500 may include a processor 502 that communicates with other elements within the sensor node 500 via a system interface or bus (not shown). Though not shown in FIG. 6, also included in the sensor node 500 may be a display device/input device for receiving and displaying data. This display device/input device may be, for example, a keyboard or pointing device that is used in combination with a monitor. The sensor node 500 may further include memory 504, which may include both read only memory (ROM) and random access memory (RAM). The node's ROM may be used to store a basic input/output system (BIOS), containing the basic routines that help to transfer information across the one or more networks.

In addition, the sensor node 500 may include at least one storage device, such as a hard disk drive, a floppy disk drive, a CD Rom drive, SD disk, optical disk drive, or the like for storing information on various computer-readable media, such as a hard disk, a removable magnetic disk, or a CD-ROM disk. As will be appreciated by one of ordinary skill in the art, each of these storage devices may be connected to the system bus by an appropriate interface. The storage devices and their associated computer-readable media may provide nonvolatile storage for a sensor node. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM. Such program modules may include an operating system and a plurality of one or more (N) modules. The modules may control certain aspects of the operation of the sensor node 500, with the assistance of the processor 502 and the operating system. For example, the modules may perform the functions described above, below and illustrated by the figures and other materials disclosed herein.

For example, in one sensor node design, a low-power hardware platform can be used. For the communication module 506, this embodiment can use a low-power radio such as, for example a TI CC1101 (Texas Instruments, Inc.), supporting a data rate of up to 500 Kbps with a maximum transmission power of 12 dBm in the 900 MHz band, which allows larger spatial coverage at the same energy consumption. Generally, the communication module 506 will also include an antenna 512. The CC1101 supports a hardware wake-on-radio feature providing extensive power savings. Further comprising this embodiment of a sensor node 500 can be a μA-accuracy energy meter 510 that allows the node 500 to monitor its energy consumption rate in real time. In other embodiments of sensor nodes that do not have an energy meter 510, energy use can be determined by a software approach by counting the operation numbers and making an assumption that the energy consumption of each operation is constant. However, an on-board energy meter 510 makes practical energy-synchronized sensor network design more feasible. In one embodiment, the sensor 500 comprises, for example, a low-power processor 502 such as a Texas Instruments MSP430 microcontroller to perform event detection. In other embodiments, different processors 502 can be used, such as an XScale or Atmel AVR32 processor with substantially faster speed (up to hundreds of MHz) and sufficient memory (but higher energy consumption rate) to support the computations required for embodiments of the invention. Further comprising each node 500 are sensors 514 such as, for example, a three-axis seismometer. In seismic imaging applications, the sensors 514 are typically geophones or MEMS accelerometers. In other sub-surface geophysical imaging applications, the sensors 514 can be infrasonic sensors, electromagnetic sensors, capacitive electrode, etc.

Figure 7:
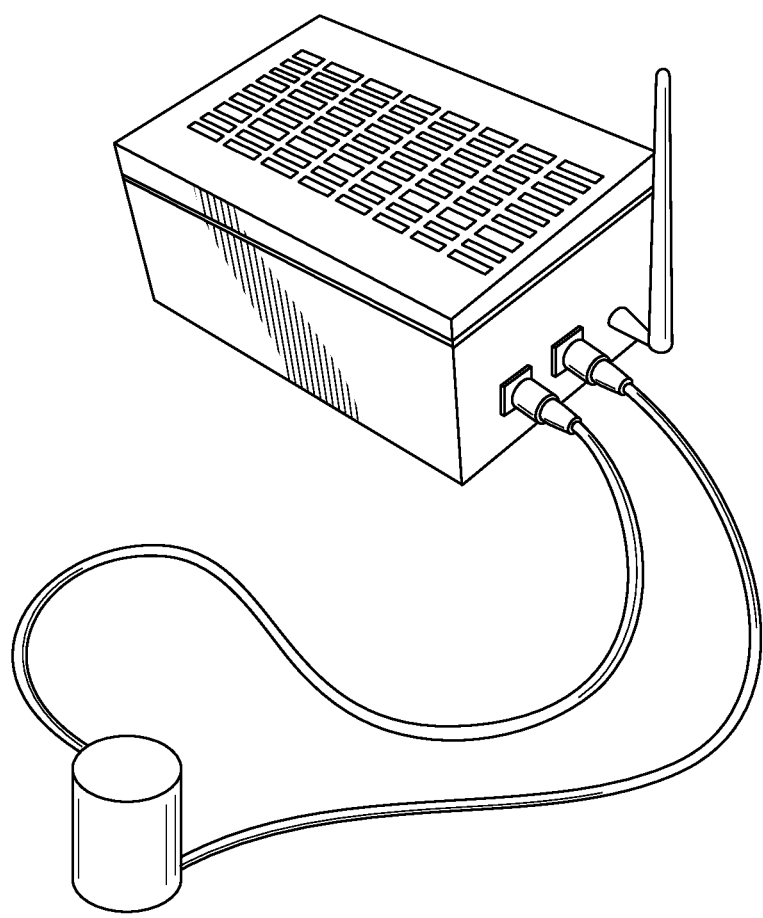
FIG. 7 illustrates an exemplary wireless sensor node for real-time sub-surface imaging.

Generally, the sensor node 500 can be enclosed in a weatherproof case 516 with external connectors for the sensors 514 and radio antenna 512. In one embodiment, the antenna comprises an 8.5 dBi antenna mounted on a pole (e.g., a 1 m pole) in order to increase radio range and reduce ground effects. Sensor nodes 500 can employ multihop routing, allowing the total size of the array to be extended over tens of kilometers. Each node 500 further comprises a sensor interface board 516 that performs high-resolution sampling and analog-to-digital conversion. For example, in one embodiment the sensor interface board 516 comprises an Analog Devices ADS1281 ADC, permitting sampling at 24 bits per sample. The sampling rate is programmable up to 1 kHz. In one aspect, the node 500 can include an energy source 508 that comprises three 10000 mAh batteries, charged by a small (24×21 cm) 6 W solar panel, though other energy sources are contemplated. For location tracking and accurate time stamping, the sensor node 500 may also include, for example, a GPS receiver 518 that can be co-deployed with the network. FIG. 7 illustrates an exemplary wireless sensor node for real-time sub-surface imaging.

While FIGS. 6 and 7 illustrate and describe wireless sensor nodes, it is to be appreciated that embodiments of the disclosed system can also comprise wired sensors where the radio and antenna is replaced with a wired network connection and interface electronics. The described plurality of sensor nodes that comprise a mesh network, as described herein, can be comprised or wireless, wired or a combination of wireless and wired sensor nodes. The term wired can be used to describe any physical medium used to connect sensor nodes or to connect a sensor node with another device and can include coaxial cable, stranded or solid wiring, or fiber optic cable.

Figure 8:
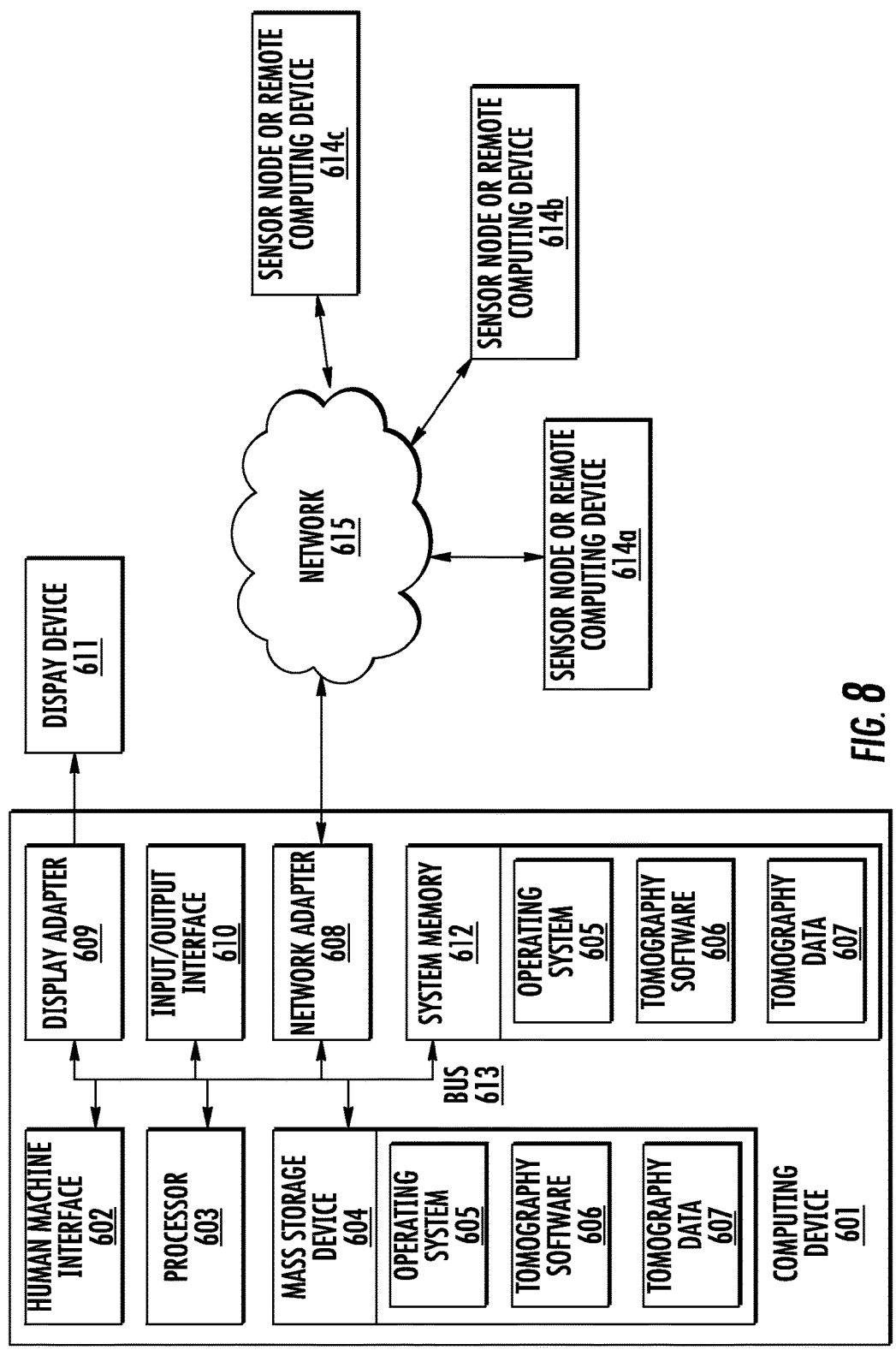
FIG. 8 illustrates an embodiment of a gateway, which can be used to practice aspects of the invention.

Further comprising an embodiment of the system can be a gateway, as illustrated in FIG. 8. One skilled in the art will appreciate that the systems and methods disclosed herein can be implemented via a gateway that comprises a general-purpose computing device in the form of a computing device 601 or computer. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, geophysical software 606, geophysical data 607 that can include the data received from the sensor nodes 500, a network adapter 608, system memory 612, an Input/Output Interface 610, a display adapter 609, a display device 611, and a human machine interface 602, can be contained within one or more remote computing devices 601 at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as geophysical data 607 and/or program modules such as operating system 605 and geophysical software 606 that are immediately accessible to and/or are presently operated on by the processing unit 603.

In another aspect, the computer 601 can also comprise other removable/non-removable, volatile/non-volatile computer storage media. By way of example, FIG. 4 illustrates a mass storage device 604 that can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and geophysical software 606. Each of the operating system 605 and geophysical software 606 (or some combination thereof) can comprise elements of the programming and the geophysical software 606. Geophysical data 607 can also be stored on the mass storage device 604. Geophysical data 607 can be stored in any of one or more files or databases known in the art. Examples of such databases comprise, DB2®, Microsoft® Access, Microsoft® SQL Server, Oracle®, mySQL, PostgreSQL, and the like. The databases can be centralized or distributed across multiple systems.

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

The computer 601 can operate in a networked environment including, for example, a mesh network of sensor nodes 500 as described herein by using logical connections to one or more sensor nodes and/or remote computing devices 614a,b,c, such as those described in relation to FIGS. 4 and 5, above.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of geophysical software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As noted above, one non-limiting embodiment of the invention comprises real-time seismic imaging based on travel-time tomography principles. The travel-time seismic tomography problem can be formulated as a large, sparse matrix inversion. Suppose there are total M earthquake events and N sensors. Let ti=[ti1, ti2, ... , ti M]T, where tij is the travel time residual experienced by sensor i in the jth seismic event. Suppose there are total L blocks in the tomography model and let s∈RL×1 denote the velocity model. For sensor i, the set of equations to solve will be ti=Ai s, (1) where Ai∈RM×L and Ai [m, l] is the intersecting length of the lth block and the ray path connecting sensor i and the source location in the mth seismic event. Since each ray path intersects the model at a small number of model nodes, the design matrix, Ai, is a sparse matrix. The seismic tomography problem is to solve s from $$\begin{bmatrix} t \\ 0 \end{bmatrix} = \begin{bmatrix} A \\ \Theta \end{bmatrix} s \qquad (2)$$

where t=[t1, t2, ... , tN]T, A=[A1, A2, ... , AN]T, and Θ is a damping parameter regularizing the inversion process. The above equation is often an overdetermined problem. To find the least-squares solution s*, i.e., $$s^* = \arg\min \; t - As. \qquad (3)$$

The calculation of the optimal velocity model s* is the most computationally intensive and time consuming aspect of tomography. Even on standard PCs or server-class machines, the calculation can take hours or days for a large number of stations. Normally, the system of equations is solved by sparse matrix methods like LSQR or other conjugate gradient methods. Various parallel algorithms have also been developed to speed up the execution of these methods. However, designed for high-performance computers, these centralized approaches need significant amount of computational/memory resources and require the knowledge of global information (e.g., t and A). As a result, they previously could not be executed by a sensor network in a distributed manner.

Described herein are approaches that can distribute the computational burden to the sensor nodes themselves. At first, all sensor nodes are initialized with a simple starting model, determined prior to deployment. Then, the real-time tomography model is updated and evolves with each subsequent active or passive event that is detected and located. In contrast to previous centralized approaches, embodiments of the described solution is fully distributed and only requires each sensor to store local information (e.g., its own arrival times ti and part of the volcano model Ai), and communicate with neighboring sensors. An embodiment comprises the following phases:

1. Ray tracing phase: Following each earthquake, rays propagate to sensors and intersect blocks in the model. Rays passing through anomalous bodies (magma accumulations) are perturbed and thus register anomalous residuals. Given the source locations of the seismic events and the current velocity model, each sensor updates the ray paths from the seismic source locations to its own physical position as well as Ai accordingly. Since each station can perform its own ray tracing, the only information each sensor node needs to pass to other stations is an integer index vector of penetrated blocks and the associated residual. Only those blocks that are penetrated by a raypath need to be updated. The residual is divided up along the ray according to the raypath segment in each block, and that proportion of the residual is added to each block.

2. Iterative optimization phase: With the updated Ai for all sensors, a distributed least-squares algorithm can be used to iteratively solve Eq. (3), above. Each sensor maintains its own velocity model si and the cluster head coordinates the distributed optimization to achieve a consensus solution s. Specifically, in each iteration, sensor i minimizes ti−Ai si and transmits the local solution si to its cluster head. Each cluster head combines the local solutions and sends the combined model back to the member sensors. Cluster heads also communicate with each other to achieve the global consensus. Updated voxels are also communicated to the gateway nodes for tomography visualization in real-time. It has been proved in that several algorithms based on the above strategy can converge to the global optimal solution. Examples of such algorithms are described herein. The communication complexity of the optimization phase is $O(N \cdot K)$ where N is the number of nodes and K is the number of iterations used.

Based on the basic idea of in-network tomography inversion described above, embodiments of methods and systems to improve the real-time performance of the distributed approach are described herein. The key challenge of real-time tomography inversion is to update the system model incrementally before all information of seismic events is available. In one aspect, distributed incremental least-squares algorithms can be used, in which history data are exponentially weighted according to oldness. In another aspect, use of a row action matrix method is described, which does not require the full design matrix to be in memory at one time. In fact, the approach of consecutive back projection can incorporate new information (raypaths or rows), on the fly, in real time. In this case the model is constantly being updated by new information as earthquakes occur and are incorporated in the inversion. This approach is ideal for real time inversion of an evolving structure where earthquakes can be dynamically included in the analysis. The dynamic updating of subsurface structural features in an erupting volcano has never been attempted before and represents a significant advance in volcano analysis, physical volcanology, and seismic monitoring for hazard mitigation.

New distributed least-squares algorithms suitable for seismic tomography are described for use in embodiments of the system. Previous least-square algorithms adopted the weighted sum of local solutions to achieve consensus, which does not account for the accuracy of seismic tomography. As described herein, it may be more efficient combining rules to speed up convergence under desired tomographic accuracy bound. Previous algorithms were designed to estimate a signal with low dimensionality. In contrast, seismic tomography is typically a high-dimension estimation problem where the volcano model A is a very large sparse matrix. The sparsity of A can be exploited to reduce the inter-node communication overhead.

In general, sub-surface imaging applications often share some similarities with seismic tomography application (especially in terms of spatial and temporal coverages and inversion natures) and can be formulated as a least-square inversion problem. Even if they are not forming as a least-square problem, the described sensing and computing architecture can often still apply. As noted herein, the described embodiments of system architecture and framework enable processing and computing that was previously done in centralized fashion after data collection to now be done in-situ among the sensors themselves in a distributed fashion to enable real-time imaging while saving resources.

Situation-Aware and Energy-Synchronized Networking

The underlying infrastructure of embodiments described herein is a large-scale smart sensor network that is situation-aware and self-adapts to resource limitations and fluctuations. A high degree of variability can be expected in the network's operating conditions over time. Volcanic activity is extremely variable. Solar charging fluctuation, ash coverage and poor weather conditions may lead to differing amounts of energy stored at each sensor node over time. Moreover, node dropout and occasional reboot can result in variable sensor data availability and network topology. Because it is desired that network processing operates robustly in the face of these fluctuations, an embodiment of an approach is described herein to deal with adverse conditions and partial, possibly temporary, system failure.

Situation-Aware Network Adaption

To ensure high data quality, embodiments of algorithms are described herein that allow the sensor nodes to adapt their behavior to accommodate changes in the network's state, including those runtime feedbacks on network topology, node population, and energy levels. For example, it is desired that the fidelity of the network's data products degrades gracefully as nodes fail, communication links are broken, or energy levels deplete.

As an example, the tomographic inversion process can be tuned to exclude sensor nodes with low energy levels, as though those stations had not detected an event in the first place. By idling nodes with limited resources, energy can be saved for later computations. Likewise, nodes can perform purely local event detection and defer updating the global tomographic model until energy is in greater supply. This will cause certain voxels in the model to decay in accuracy but these voxels can be updated as soon as those nodes come online again. By sharing voxels across nodes within a cluster, the algorithm can tolerate individual node failures.

Network lifetime and energy efficiency can be traded off explicitly for data quality, by scaling back on the amount of processing or data transmission each node performs to process a given earthquake. For example, strong earthquakes will yield very clear P-wave onsets, and it may not be necessary to involve all of the nodes since the resulting event location will be very accurate. To perform event localization, accurate P-wave picks from a subset of well-distributed sensor nodes (e.g., at least four) may be required, although picks from additional nodes can constrain the error envelope. Depending on the earthquake's estimated location and the precision of the current model, a subset of sensor nodes can be adaptively chosen to perform the tomographic inversion for each event. This has the effect of load balancing across the network, substantially prolonging overall lifetime. Furthermore, some data may have more important contribution to tomography model updates than other data. Thus, the data delivery can be prioritized and certain pair of nodes may have higher priority to synchronize their duty-cycles for faster data delivery. A distributed approach to find the least-cost and least-delay routing structure that satisfies given information quality constraints is desired. A potential approach is based on a topology-aware histogram aggregation structure that encapsulates the cost of including the data quality contribution of each activated node.

In another aspect, adapting network fidelity can be performed on a utility-driven approach, in which data is collected or processed at nodes based on its expected contribution to the global model. Utility functions can be used to drive raw data collection from nodes. This approach can be significantly extended to encompass intermediate data products, allowing the system to intelligently allocate computational, bandwidth, and energy resources based on the data acquired at each station. Cluster head nodes can assign an expected utility to each data product in the computation. Nodes then allocate resources to achieve utility maximization under constraints such as an expected battery lifetime target.

Energy-Synchronized Resource Coordination

Techniques for energy conservation in sensor networks include MAC, routing, topology control protocols, as well as cross-layer optimizations. However, reducing total energy consumption does not necessary prolong global network lifetime. A challenge for deploying sensor network technology is whether a battery or solar powered sensor network can provide required monitoring service quality while meeting lifetime requirements. In one embodiment of the invention, energy-synchronized resource coordination mechanisms, including task management inside each node and communication coordination across the network can be used. As noted herein, sensor nodes can have on-board low-cost energy meters making practical energy-synchronized design possible.

Inside each node, tasks can be synchronized and prioritized with energy budgets to meet the lifetime and service quality requirements. The sensing, transmitting, receiving and computing tasks have different priorities at different states. Each node can determine the set of tasks required to run in proper order, so that network service quality is not compromised. Real time decisions can be made to determine whether data should be stored in local memory (e.g., flash) or transmitted via radio or whether data should be processed to generate high-level metadata so that the data quality has minimum degradation. In one embodiment, a generalized, energy-synchronized middleware, closely coupled to the task scheduler of the operating system of the sensor network (e.g., TinyOS) can be used to prioritize tasks based on application needs, energy conditions and task dependencies.

In an energy-synchronized network, each node can put its radio state in periodic active or sleep modes (e.g., duty-cycle), synchronizing with its energy level to ensure continuous operation. As energy fluctuates, duty-cycle fluctuates and some nodes may have to enter dormant mode. Dynamic energy conditions and harsh volcanic environments may possibly disrupt communications, introducing a high degree of variability in the network's operating conditions over time. Traditional routing protocols have assumed an always-connected network where the goal was to find a best path connecting source with destination. Here, by contrast, network connectivity is dynamic and determined by every adjacent node pair's duty-cycle and status. In one aspect, an energy-synchronized MAC and routing protocol stack, such that the medium access and packet routing are synchronized with energy fluctuation and tolerate network disruptions can be used. Given an energy map where each pixel in the map represents energy level in the node, a challenge is to design distributed communication protocols that optimize resources and data flows corresponding to this map, such that the network delay and disruption can be minimized. In one aspect, social-inspired mechanisms for collaborative resource coordinations can be used. For example, in order to reach an energy balance across the network, Atkinson's Inequality index can be used as a routing metric, which is a measure of economic income inequality in a society.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

"COMPONENT-AVERAGE BASED DISTRIBUTED SEISMIC TOMOGRAPHY IN SENSOR NETWORKS" by Kamath et al., pgs. 1-8, as published in the proceedings of the 2013 IEEE International Conference on Distributed Computing in Sensor Systems, May 20-23, 2013, Cambridge, Mass., which is attached hereto, incorporated by reference in its entirety, and made a part hereof; and "IMAGING SEISMIC TOMOGRAPHY IN SENSOR NETWORK" by Shi et al, pgs. 1-9, which was published in the proceedings of the 2013 10th Annual IEEE Communications Society Conference on Sensor, Mesh and Ad Hoc Communications and Networks (SECON), Jun. 24-27, 2013, New Orleans, La., For Examples, see, for example ", Distributed Tomography with Adaptive Mesh Refinement in Sensor Networks," by Kamath et al., International Journal of Sensor Network, 2015; and "Distributed Randomized Kaczmarz and Applications to Seismic Imaging in Sensor Network," by Kamath et al., The 11th International Conference on Distributed Computing in Sensor Systems (DCOSS), Fortaleza, Brazil, 2015; which are fully incorporated herein by reference, and made a part hereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A real-time in-situ sub-surface imaging system comprised of:
   a plurality of wireless sensor nodes and a plurality of wired sensor nodes, wherein each sensor node comprises:
      a processor in communication with a memory;
      a communication module;
      an energy source;
      a sensor; and
      a sensor interface board; and
   a mesh network comprised of the wireless and wired sensor nodes, wherein the plurality of wireless sensor nodes communicate wirelessly with other wireless sensor nodes and the plurality of wired sensor nodes communicate through wires to other wire sensor nodes and wherein the plurality of wireless and wired sensor nodes sense geophysical signals, self-form and self-adapt to form the mesh network for communication among the plurality of sensor nodes,
   wherein distributed data processing and sub-surface imaging computing are performed in the mesh network of sensor nodes in real-time.

2. The system of claim 1, wherein performing distributed data processing and sub-surface imaging computing in the mesh network of sensor nodes in real-time comprises performing distributed seismic data processing and tomographic imaging computing in the mesh network of sensor nodes in real-time.

3. The system of claim 2, wherein performing distributed seismic data processing and tomographic computing in the mesh network of sensor nodes in real-time comprises the one or more sensor nodes detecting and locating a seismic event, determining a ray path from the location of the seismic event to the sensor node, and determining at least a portion of a real-time image of an item of interest using the ray path and a distributed tomographic inversion algorithm.

4. The system of claim 3, wherein a resolution of said real-time image of the item of interest increases with additional detected seismic events.

5. The system of claim 3, wherein the item of interest is an oil, gas, mine exploration, or other geological environments.

6. The system of claim 3, wherein the distributed tomographic inversion algorithm comprises vertical-partition tomographic inversion or component-average based distributed seismic tomography inversion.

7. The system of claim 1, wherein a user can retrieve and monitor results of the real-time distributed data processing and sub-surface imaging computing through the one or more sensor nodes.

8. The system of claim 7, wherein the user retrieves and monitors the real-time sub-surface imaging results through a gateway configured to communicate with the wireless sensor nodes and the wired sensor nodes.

9. The system of claim 8, wherein the gateway displays at least a portion of a real-time image of an item of interest.

10. The system of claim 8, wherein at least one of the plurality of sensor nodes comprises a cluster head and the cluster head provides at least a portion of the results of the real-time distributed data processing and sub-surface imaging computing to the gateway.

11. The system of claim 1, wherein the sensor nodes further comprise an energy meter, and computations are performed by each sensor node based on energy used as determined by the energy meter.

12. A method of real-time in-situ sub-surface imaging comprising:
   sensing geophysical data, by a sensor node in a mesh network comprised of a plurality of wired and a plurality of wireless sensor nodes, wherein the wireless sensor nodes communicate wirelessly with other wireless sensor nodes and the wired sensor nodes communicate through wires to other wire sensor nodes; and
   performing a portion of real-time sub-surface imaging computation based at least in part on data received by the sensor node.

13. The method of claim 12, wherein sensing, by the sensor node in a mesh network of a plurality of sensor nodes, geophysical data, comprises detecting, by at least one of the sensor nodes in the mesh network of a plurality of sensor nodes, an event.

14. The method of claim 13, wherein the sub-surface imaging comprises seismic tomography, and the event is an earthquake or microearthquake or a seismic event caused by an active source.

15. The method of claim 14, wherein performing at least a portion of real-time sub-surface imaging computation based at least in part on data received by the sensor node comprises determining, by the detecting at least one sensor node, a ray path from a location of the seismic event to the sensor node; and determining, by the detecting at least one sensor node, at least a portion of a real-time image of an item of interest using the ray path and a distributed tomographic inversion algorithm.

16. The method of claim 15, wherein a resolution of said real-time image of the item of interest, as determined by the detecting at least one sensor node, increases with more detected seismic events.

17. The method of claim 12, wherein at least one of the plurality of sensor nodes comprises a gateway configured to communicate with the wireless sensor nodes and the wired sensor nodes, and wherein a user can monitor real-time sub-surface imaging results through the at least one sensor node that acts as the gateway.

18. The method of claim 17, wherein at least one of the plurality of sensor nodes comprises a cluster head and the cluster head provides at least a portion of a real-time sub-surface imaging result to the gateway.

* * * * *

UNITED STATES PATENT AND TRADEMARK OFFICE
CERTIFICATE OF CORRECTION

PATENT NO. : 10,393,896 B2
APPLICATION NO. : 15/321962
DATED : August 27, 2019
INVENTOR(S) : WenZhan Song It is certified that error appears in the above-identified patent and that said Letters Patent is hereby corrected as shown below:

In Claim 1 at Column 17, Line 36, "wire" should read --wired--

In Claim 12 at Column 18, Line 29, "wire" should read --wired--

Signed and Sealed this
Nineteenth Day of November, 2019

Andrei Iancu
*Director of the United States Patent and Trademark Office*